(12) United States Patent
Atzmüller et al.

(10) Patent No.: US 10,040,488 B2
(45) Date of Patent: Aug. 7, 2018

(54) B PILLAR

(71) Applicant: voestalpine Stahl GmbH, Linz (AT)

(72) Inventors: Peter Atzmüller, Linz (AT); Alexander Poledna, Linz (AT)

(73) Assignee: voestalpine Stahl GmbH, Linz (AT)

( * ) Notice: Subject to any disclaimer, the term of this patent is extended or adjusted under 35 U.S.C. 154(b) by 0 days.

(21) Appl. No.: 15/509,097

(22) PCT Filed: Jul. 21, 2015

(86) PCT No.: PCT/EP2015/066633
§ 371 (c)(1),
(2) Date: Mar. 6, 2017

(87) PCT Pub. No.: WO2016/034324
PCT Pub. Date: Mar. 10, 2016

(65) Prior Publication Data
US 2017/0267292 A1    Sep. 21, 2017

(30) Foreign Application Priority Data

Sep. 4, 2014    (DE) .................. 10 2014 112 740

(51) Int. Cl.
*B62D 21/15* (2006.01)
*B62D 25/04* (2006.01)
*B62D 29/00* (2006.01)

(52) U.S. Cl.
CPC .......... *B62D 29/007* (2013.01); *B62D 25/04* (2013.01); *B62D 21/157* (2013.01)

(58) Field of Classification Search
CPC ..... B62D 21/157; B62D 25/04; B62D 29/007

USPC ............................................ 296/193.06
See application file for complete search history.

(56) References Cited

U.S. PATENT DOCUMENTS

| | | | | |
|---|---|---|---|---|
| 6,820,924 B2 | 11/2004 | Caliskan et al. | | |
| 2010/0308623 A1* | 12/2010 | Bodin | ............. | B62D 25/04 296/193.06 |
| 2011/0095567 A1* | 4/2011 | Ishigame | ............. | B62D 21/157 296/187.03 |
| 2011/0133515 A1* | 6/2011 | Mori | ............. | B62D 21/157 296/193.06 |
| 2012/0161475 A1* | 6/2012 | Mori | ............. | B62D 21/152 296/193.06 |
| 2013/0241239 A1* | 9/2013 | Mori | ............. | B62D 21/157 296/193.06 |
| 2014/0008938 A1* | 1/2014 | Busch | ............. | B62D 25/04 296/193.06 |
| 2014/0339855 A1* | 11/2014 | Torii | ............. | B62D 25/04 296/193.06 |

(Continued)

FOREIGN PATENT DOCUMENTS

DE    10041641 A1    3/2002
DE    102005038488 A1    2/2007
(Continued)

*Primary Examiner* — Gregory A Blankenship

(57) ABSTRACT

A B pillar of a motor vehicle with a base region and a head region; in the base region, there is a contact region with a connecting region for connecting the B pillar to a rocker panel; over the span of its height from a base edge to a B pillar head, the B pillar has hard and soft regions, wherein the B pillar has a soft region, which extends from a contact region of the B pillar with the rocker panel to the B pillar head and in this case, extends for at least 100 mm.

6 Claims, 3 Drawing Sheets

(56) References Cited

U.S. PATENT DOCUMENTS

| | | | | |
|---|---|---|---|---|
| 2016/0046328 A1* | 2/2016 | Steffens | ............... | B21D 47/01 |
| | | | | 296/193.06 |
| 2016/0186280 A1* | 6/2016 | Breidenbach | ........ | C21D 9/0068 |
| | | | | 148/525 |
| 2017/0253276 A1* | 9/2017 | Shimizu | ............... | B62D 29/007 |
| 2017/0267292 A1* | 9/2017 | Atzmuller | ............ | B62D 29/007 |
| 2017/0341684 A1* | 11/2017 | Goldyn | ................. | B62D 25/04 |

FOREIGN PATENT DOCUMENTS

| | | |
|---|---|---|
| DE | 102011005977 A1 | 9/2012 |
| EP | 1180470 A1 | 2/2002 |
| EP | 2209696 | 7/2010 |
| WO | 2009064236 A1 | 5/2009 |

* cited by examiner

B PILLAR

FIELD OF THE INVENTION

The invention relates to a B pillar for a motor vehicle.

BACKGROUND OF THE INVENTION

In the construction of the passenger compartment, known motor vehicles have an A pillar, a B pillar, and a C pillar, with the B pillar being the middle one of these pillars, extending from a rocker panel at the bottom to a roof structure at the top.

In this case, the B pillar is usually provided with a latch for the front doors (driver's door, passenger's door) and—if provided—hinges for the rear doors; the hinges of the rear doors can also be provided on the C pillar, in which case the latch is likewise provided (on the rear side) of the B pillar in the same way as with sliding doors in the rear region.

The original purpose of the B pillar is on the one hand, to hold the hinges of the rear doors and support the latch of the front doors and on the other hand, to support the roof structure.

In the context of constantly improving crash safety of passenger compartments, however, the B pillar also serves an essential function for the stability of the passenger compartment.

For several years now, it has been common practice to design passenger compartments to be increasingly more rigid and to use heat-treated steels, which are shaped and hardened using the applicant's special methods for press hardening or form hardening. Such formed and hardened steel components and B pillars in particular have a very high strength of Rm≈1,500 MPa.

In the past, it has turned out that uniformly hardened steel components are not optimal for the passenger compartment. Especially in the event of a crash, these components can break since as a result of their high hardness, they also have a certain degree of brittleness and are not able to absorb energy by deforming, but instead are much more likely to break.

In order to improve the crash behavior of such B pillars, it is known for the base of the B pillar in particular to either not be hardened or for it to not be entirely hardened, thus producing more ductile, flexible regions of the B pillar.

Such B pillars are known, for example, from EP 1 180 470 A1 and U.S. Pat. No. 6,820,924.

EP 2 209 696 B1 has disclosed a B pillar for a vehicle, which has, an upper fastening region for fastening to a roof component and a lower fastening region for fastening to a rocker panel; the main section of the B pillar has an essentially martensitic structure with a tensile strength of at least 1,300 MPa and a weaker lower region of the B pillar with a tensile strength of no more than 800 the weaker region has a height of greater than 30 mm, but extends for less than ⅓ of the overall height of the B pillar and is positioned so that the lower fastening region is essentially martensitic. Preferably, the weaker region has a height that is less than ¼ of the overall height of the B pillar, with the weaker region having a height of between 50 mm and 200 mm. In this B pillar, the soft region is spaced significantly apart from a fastening region on the rocker panel. The relatively narrow band with the lower strength, which preferably should be less than 200 mm wide, is particularly situated in the lower half, preferably in the lowest third, of the pillar, but at a significant distance from the B pillar fold resting on the rocker panel.

The object of the invention is to design a B pillar in a crash-optimized way for a motor vehicle.

SUMMARY OF THE INVENTION

The invention is based on recognition of the fact that the placement of soft zones and hard zones known from the prior art does not provide satisfactory crash properties. In particular, the 30 mm disclosed as a minimum requirement in EP 2 209 696 B1, for example, is much too narrow a region to meet crash requirements. Also the spaced-apart placement of the soft zone relative to the B pillar base is not beneficial.

The inventors have discovered that only the region of the B pillar that is situated in the vicinity of the rocker panel can be embodied as hard and this must be directly adjoined, by a soft region that cannot be spaced apart from this region, in particular, this means that the rocker panel flange or the regions of the rocker panel flange of the B pillar in which the spot welds for attaching it to the rocker panel are provided can be hard, but the regions above the rocker panel flange must in any case be embodied as soft.

As defined by the invention, the term "hard" means a tensile strength >1,400 N/mm$^2$ and the term "soft" means a tensile strength <850 N/mm$^2$.

In one embodiment of the invention, except for a narrow band of the rocker panel flange in which the spot welds are provided, the rest of the rocker panel flange is also soft, as is a region of at least 100 mm above the rocker panel fold edge situated above the rocker panel flange.

In particular, the rocker panel flange itself can be embodied as soft except, for a narrow band for the welded attachment.

It is particularly preferable for the region below the narrow band for the welded attachment to be embodied as soft, as shown in FIG. 1. This results in a low strain on the rocker panel in the event of a crash.

BRIEF DESCRIPTION OF THE DRAWING

The invention will be explained by way of example below based on the drawings. In the drawings.

DETAILED DESCRIPTION OF THE PREFERRED EMBODIMENTS

Figure 1:
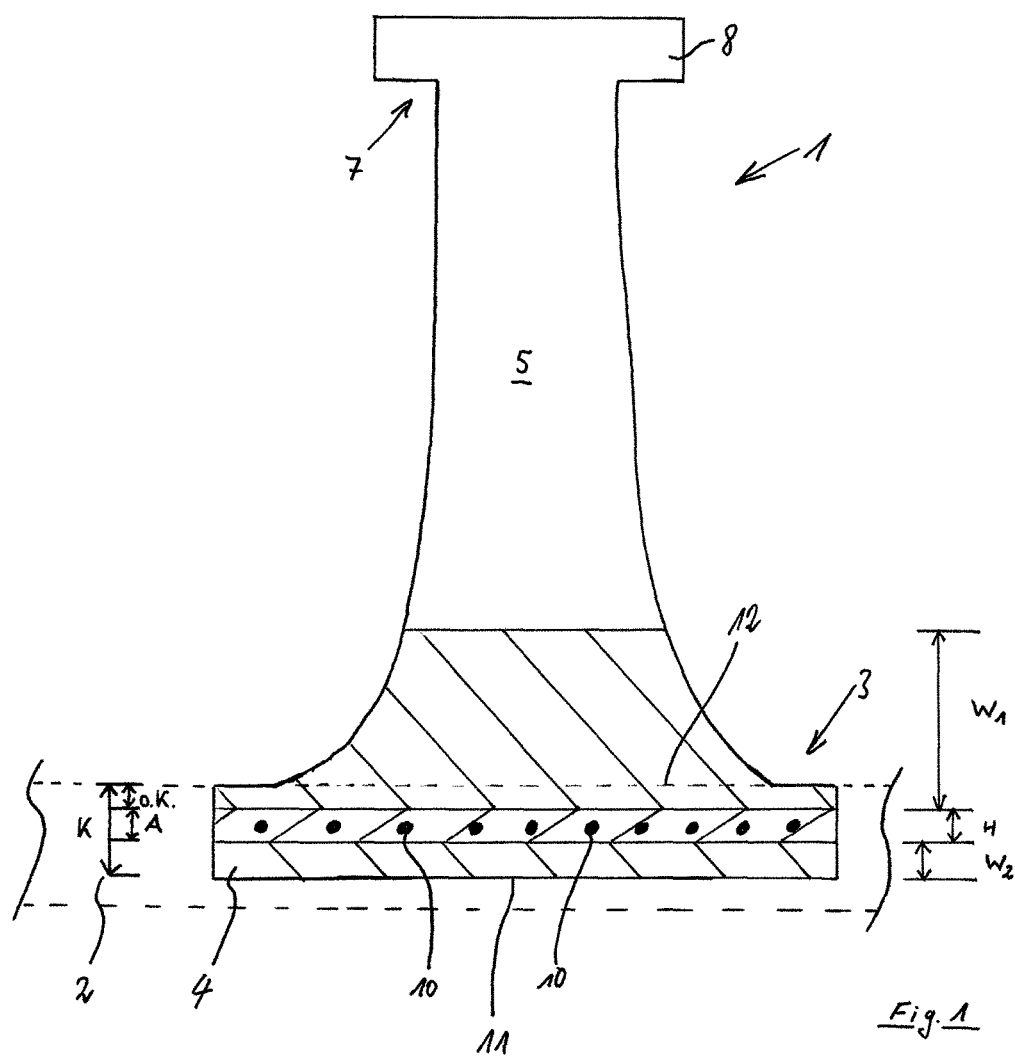
FIG. 1: shows a schematic view of a first embodiment of the invention.
Figure 2:
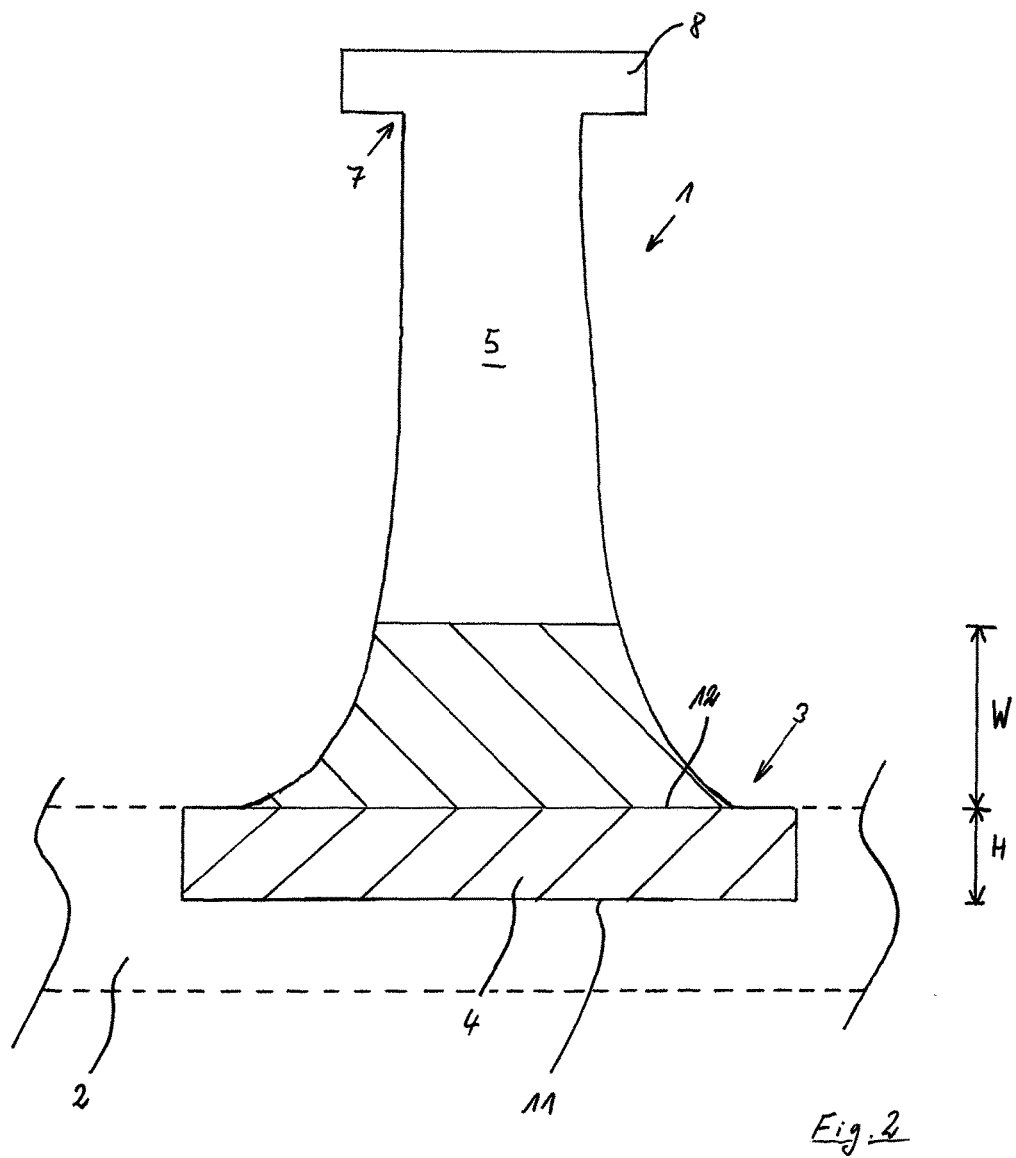
FIG. 2: shows a schematic view of another embodiment of the invention.
Figure 3:
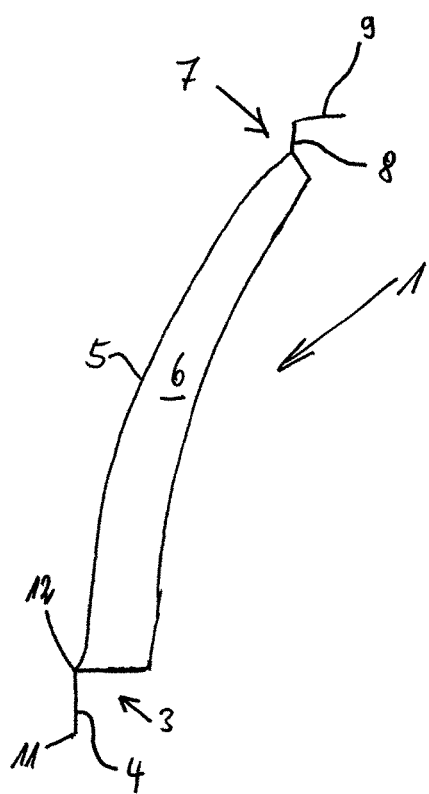
FIG. 3: shows a side view of a B pillar.
Figure 4:
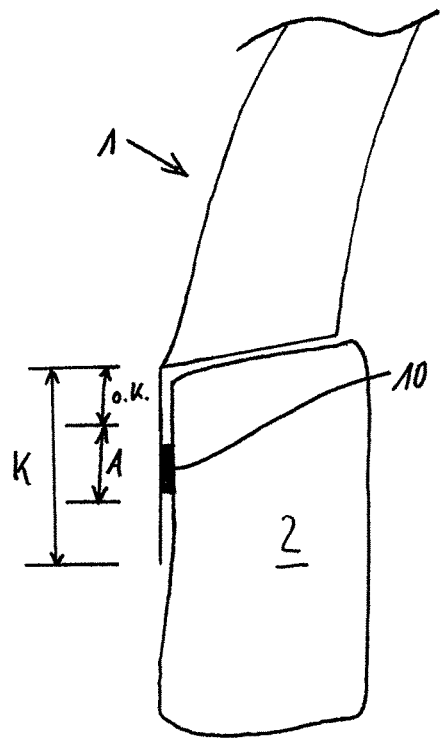
FIG. 4: shows a schematic, partially sectional view of a B pillar on a rocker panel.

A B pillar 1 is for placement between a rocker panel 2 (shown in FIGS. 1 and 2) and a roof region of a motor vehicle (not shown). To this end, the base 3 of the B pillar 1 has a rocker panel attachment 4 or connecting tab 4, which is usually composed of a flat region of sheet metal, but whose contour can be adapted to the outer contour of a rocker panel 2 and which serves as a contact region K between the B pillar base 3 and the rocker panel 2.

From the base 3 or connecting tab 4, the B pillar extends upward like a box and is curved toward a vehicle interior.

The box-like, curved region is embodied as U-shaped in cross-section, with a region that is open toward the vehicle interior, a B pillar outside 5, and two flanks 6 extending away from the B pillar outside 5. In a connecting region to a roof region, the head 7 of the B pillar 1, there is a connecting tab 8 for connecting to a roof structure of the vehicle, the connecting tab 8 having connecting pieces 9 that point toward the vehicle interior.

The B pillar 1 is usually placed on, a rocker panel 2 by means of spot welds 10 in the contact region K between the B pillar and the rocker panel, i.e. the region of the connecting tab 4, which connects the connecting tab 4 to the outside of the rocker panel 2.

The connection of the rocker panel to the B pillar is often not carried out uniformly over the entire contact region K, but is instead particularly situated in the connecting region A between the B pillar base and the rocker panel, i.e. the connecting region A in which for example the spot welds are located—which is a subregion A of the contact region K.

A B pillar 1 according to the invention is produced using the so-called press hardening method in which a flat blank composed of a hardenable sheet steel material is cold-formed into a complete preform, then heated to a temperature above $Ac_3$ in order to austenitize the structure of the steel material, and then quenched in a forming tool and thus hardened. Alternatively, a flat sheet metal blank made of a hardenable steel material is heated to a temperature above $Ac_3$ and thus austenitized and is then shaped and, hardened in one step.

According to the invention, however, the entire blank is not hardened; instead, soft regions are formed in the region of the base of the blank.

In order to ensure an optimal introduction of force and an optimal flow of force and frictional connection between the B pillar 1 and the rocker panel 2, at least the region of the rocker panel attachment 4 in which the spot welds 10 are located must be embodied as hard, i.e. in this case, quench hardening must be performed (FIG. 1), so that at least in the connecting region A, i.e. in the region in which the B pillar is connected in particular welded—to the rocker panel 2, a hardened strip H (FIG. 1) is formed. Below this strip down to a base edge 11 of the B pillar 1, a soft region $W_2$ can be provided; above the strip H and above a folding edge 12 between the contact region K and the outside 5, a second soft region $W_1$ is provided. Above the connecting region is the upper contact region oK. This is a subregion of the entire contact region K.

The region $W_1$, W must have a minimum width of 100 mm, thus enabling the B pillar to fold in an energy-absorbing way in the event of a crash.

The hardened region of the contact region K, however, can also include the entire height of the contact region K between the edge 11 and the fold 12, in particular the region of the B pillar that is situated in the connecting region A of the rocker panel 2.

At least the connecting region A of the B pillar to the rocker panel, however, must have a hardened structure.

The hard region H (FIG. 2), however, must under no circumstances protrude beyond the rocker panel region, i.e. beyond the folding edge 12, for example, since otherwise, the folding of the B pillar is also not assured. In this case as well, the region W must be at least 100 mm wide.

A sufficiently large number of options for producing the soft regions are available to the person skilled in the art. In particular, the soft region can be produced by not heating the sheet to the austenitization temperature in this region or, if it has been heated to above the austenitization temperature, by cooling it in this region at a cooling speed that lies below the critical hardening speed, or these regions are tempered again after the quench hardening.

As defined by the invention, the term "hard" means a tensile strength >1,400 $N/mm^2$ and the term "soft" means a tensile strength <850 $N/mm^2$.

One advantage of the invention is that a H pillar is produced whose soft regions are positioned so that an optimal crash behavior and in particular, folding behavior of the B pillar is assured, with an optimal flow of force into the rocker panel.

The invention claimed is:

1. A B pillar of a motor vehicle, comprising:
   a base region;
   a head region; and
   a contact region in the base region with a connecting region for connecting the B pillar to a rocker panel;
   over a span of its height from a base edge to a B pillar head, the B pillar has hard and soft regions, wherein the B pillar has a first soft region, which extends from a contact region of the B pillar with the rocker panel to the B pillar head for a distance of at least 100 mm, and a second soft region below the connecting region of the B pillar with the rocker panel, which extends to the B pillar base region.

2. The B pillar according to claim 1, wherein the first soft region extends from an upper contact region of the B pillar with the rocker panel to the B pillar head.

3. The B pillar according to claim 1, wherein the fit soft region extends beyond a fold line between the contact region and a B pillar outside and into the contact region.

4. The B pillar according to claim 2, wherein in the contact region, at least one connecting region, in which the joining points with the rocker panel are positioned, is embodied as hard.

5. The B pillar according to claim 1, wherein the B pillar is hardened above the fit soft region.

6. The B pillar according to claim 1, wherein the hard regions have a tensile strength >1,400 $N/mm^2$ and the soft regions have a tensile strength <850 $N/mm^2$.

\* \* \* \* \*